(12) United States Patent
Cameron

(10) Patent No.: US 6,823,442 B1
(45) Date of Patent: Nov. 23, 2004

(54) METHOD OF MANAGING VIRTUAL VOLUMES IN A UTILITY STORAGE SERVER SYSTEM

(75) Inventor: Douglas J. Cameron, Woodinville, WA (US)

(73) Assignee: 3PARdata, Inc., Fremont, CA (US)

( * ) Notice: Subject to any disclaimer, the term of this patent is extended or adjusted under 35 U.S.C. 154(b) by 0 days.

(21) Appl. No.: 10/840,956

(22) Filed: May 7, 2004

Related U.S. Application Data

(60) Provisional application No. 60/470,018, filed on May 12, 2003.

(51) Int. Cl.$^7$ ............................................. G06F 12/00
(52) U.S. Cl. .......................... 711/220; 711/6; 711/114; 711/173; 711/202; 711/203; 711/206; 711/207; 711/208; 711/221
(58) Field of Search ............................ 711/6, 114, 173, 711/202, 203, 206, 207, 208, 220, 221

(56) References Cited

U.S. PATENT DOCUMENTS

| | | | | |
|---|---|---|---|---|
| 4,947,319 | A | * | 8/1990 | Bozman ...................... 711/118 |
| 5,394,537 | A | * | 2/1995 | Courts et al. ............... 711/202 |
| 6,092,157 | A | * | 7/2000 | Suzuki ........................ 711/147 |
| 6,260,129 | B1 | * | 7/2001 | Crockett et al. ............ 711/170 |
| 6,421,767 | B1 | * | 7/2002 | Milillo et al. ............... 711/162 |
| 6,477,612 | B1 | * | 11/2002 | Wang ............................. 711/2 |
| 6,658,478 | B1 | * | 12/2003 | Singhal et al. .............. 709/232 |
| 6,732,171 | B2 | * | 5/2004 | Hayden ........................ 709/223 |
| 2002/0112113 | A1 | * | 8/2002 | Karpoff et al. ................. 711/4 |
| 2003/0131207 | A1 | * | 7/2003 | Arakawa et al. ............ 711/162 |
| 2003/0140210 | A1 | * | 7/2003 | Testardi ....................... 711/203 |
| 2003/0204597 | A1 | * | 10/2003 | Arakawa et al. ............ 709/226 |
| 2003/0225884 | A1 | * | 12/2003 | Hayden ....................... 709/226 |
| 2004/0111485 | A1 | * | 6/2004 | Mimatsu et al. ............ 709/213 |

OTHER PUBLICATIONS

Milligan et al., "Online Storage Virtualization: The Key to Managing the Data Explosion," pp 3052–3060, IEEE, Jan. 10, 2002.*
de Jonge et al., "The Logical Disk: A New Approach to Improving File Systems," pp 15–28, ACM, Dec. 1993.*
Wilkes et al., "The HP AutoRAID Hierarchical Storage System," pp 108–136, ACM, Feb. 1996.*
Gibson et al., "File Server Scaling with Network–Attached Secure Disks," pp 272–284, ACM, Jun. 1997.*

* cited by examiner

*Primary Examiner*—Stephen Elmore
(74) *Attorney, Agent, or Firm*—Patent Law Group, LLP; David C. Hsia

(57) ABSTRACT

A method is provided to allow a system administrator of a utility storage server to provision virtual volumes several times larger than the amount of physical storage within the storage server. A virtual volume is a virtual representation of multiple disks as a single large volume to a host or an application. In one embodiment, a virtual volume comprises an exception list containing the set of differences from dummy base volume consisting of all zeros. This exception list can be made up of address tables that map virtual volume pages to logical disk pages. As storage demand grows, additional storage is allocated for the address tables and the data pages from separate pools of storage. If any of the pools runs low, more logical disk regions are allocated to that pool.

18 Claims, 8 Drawing Sheets

METHOD OF MANAGING VIRTUAL VOLUMES IN A UTILITY STORAGE SERVER SYSTEM

CROSS REFERENCE TO RELATED APPLICATIONS

This application claims the benefit of U.S. Provisional Application No. 60/470,018, filed May 12, 2003, and incorporated herein by this reference.

FIELD OF INVENTION

This invention relates to a utility storage server and more particularly to virtual volume management of the utility storage server.

DESCRIPTION OF RELATED ART

A utility storage server may be defined as any carrier-class storage system that provisions physical storage to multiple users and/or applications. To meet the demands of multiple users and applications, a system administrator has to purchase enough physical storage for the users and the applications. Often the purchased physical storage is underutilized as the users and the applications generally fill their provisioned storage over time. Thus, what is needed is a method that allows the system administrator to increase asset utilization and defer expenses spent on the physical storage.

SUMMARY

In one embodiment of the invention, a method is provided to allow a system administrator of a utility storage server to provision virtual volumes several times larger than the amount of physical storage within the storage server. A virtual volume is a virtual representation of multiple disks as a single large volume to a host or an application. In one embodiment, a virtual volume comprises an exception list containing the set of differences from a dummy base volume consisting of all zeros. This exception list can be made up of address tables that map virtual volume pages to logical disk pages. As storage demand grows, additional storage is allocated for the address tables and the data pages from separate pools of storage. If any of the pools runs low, more logical disk regions are allocated to that pool.

DETAILED DESCRIPTION

For a description of a utility storage server, please see U.S. Pat. No. 6,658,478, entitled "Data Storage System," and U.S. patent application Ser. No. 09/883,681, entitled "Node Controller for a Data Storage System," which are incorporated by reference in their entirety.

Figure 1:
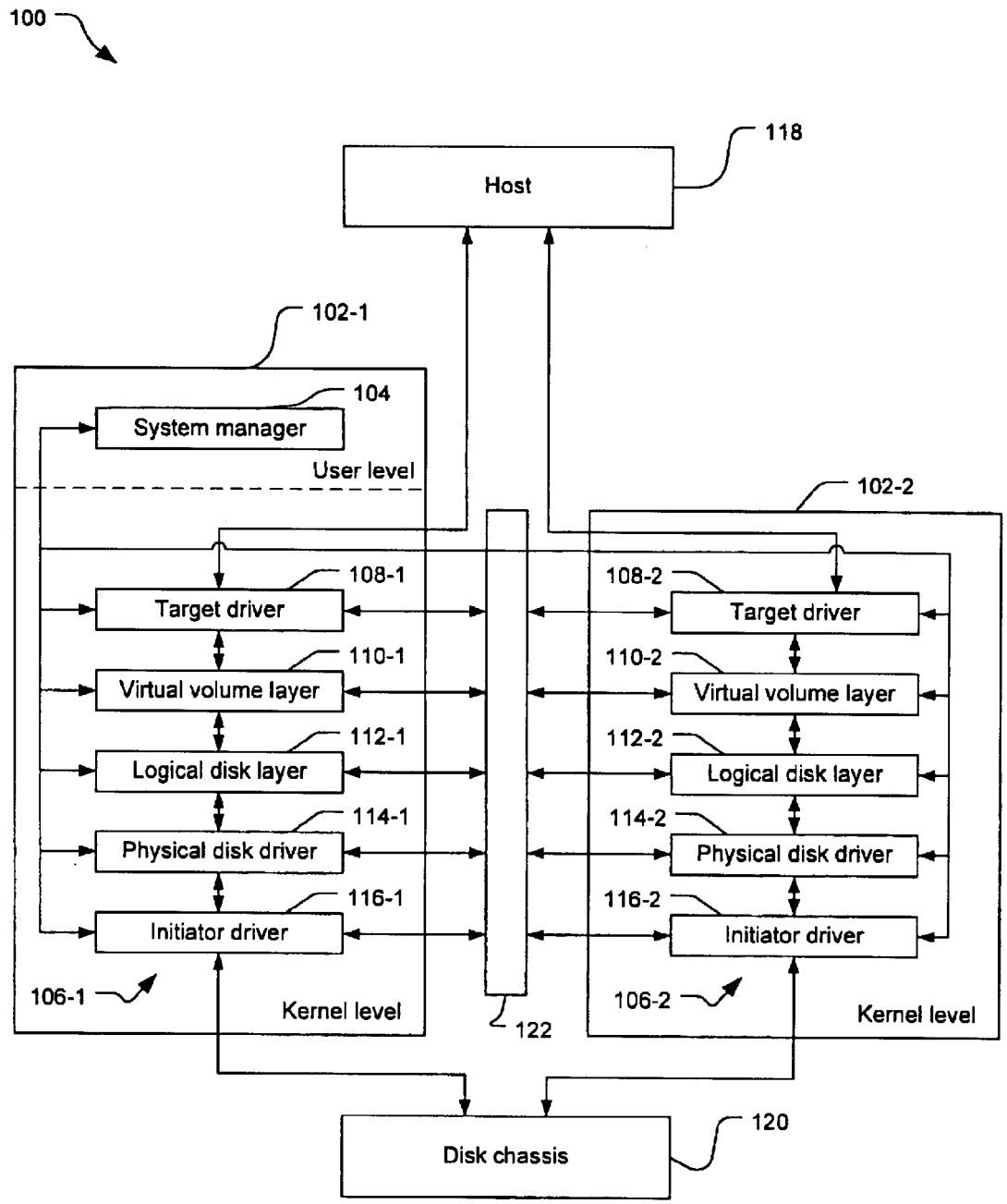
FIG. 1 illustrates a software architecture of a utility storage server in one embodiment of the invention.

FIG. 1 illustrates a software architecture of a utility storage server 100 in one embodiment. For simplicity, utility storage server 100 is shown to include a cluster of nodes 102-1 and 102-2 although the cluster may include additional nodes.

Node 102-1 includes a system manager 104 residing in the user level above the operating system and a data stack 106-1 residing in the kernel level of the operating system. Data stack 106-1 includes a target driver 108-1, a virtual volume layer 110-1, a logical disk layer 112-1, a physical disk layer 114-1, and an initiator driver 116-1.

Initiator driver 116-2 performs the actual reads and writes to the physical disk drive using, e.g., the SCSI protocol. Physical disk layer 114-1 routes the read and write requests to the appropriate node with access to the physical disk drives on disk chassis 120.

Figure 3:
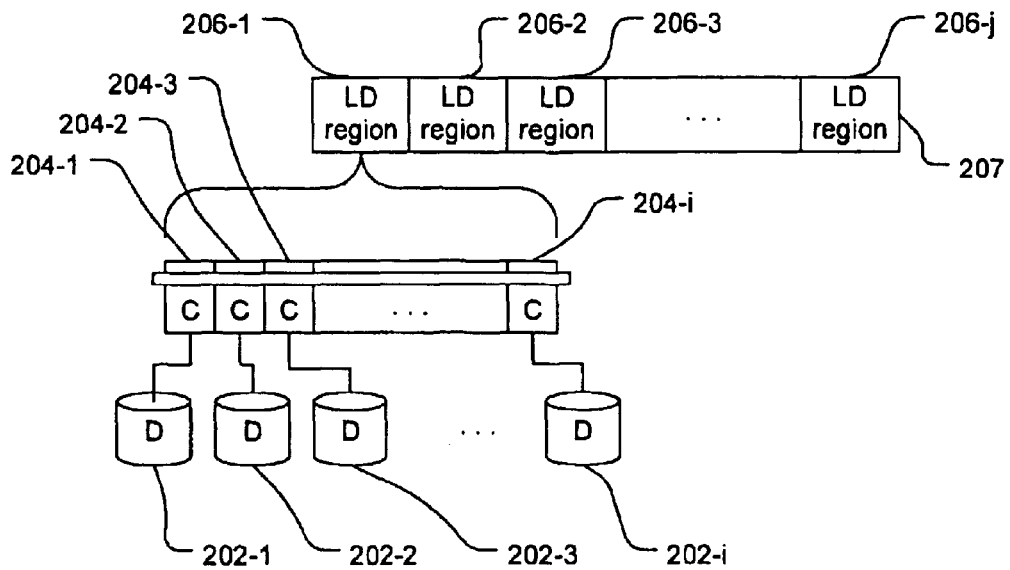
FIG. 3 illustrates the mapping of logical disk regions to physical disks in one embodiment of the invention.

Logical disk layer 112-1 organizes "chunklets" of physical disks 202-1 to 202-i (FIG. 3) into logical disks (LDs) of specific RAID levels. In one embodiment, a chunklet is 256 megabytes of contiguous disk space. System manager 104 allocates logical disk storage space, in units of logical disk regions (shown as a stripe through chunklets 204-1 to 204-i from physical disks 202-1 to 202-i in FIG. 3), to virtual volume layer 110-1. In one embodiment, an LD region is 256 megabytes of logical disk storage space. Virtual volume layer 110-1 divides up each LD region into pages for storing data. In one embodiment, a page has a size of 16 kilobytes and holds thirty-two 512 byte data blocks. Virtual volume layer 110-1 maps pages in a virtual volume to pages in the logical disk and sends the read/write requests to the proper logical disk addresses within logical disk layer 112-1.

Target driver 108-1 communicates the read and write requests to virtual volume layer 11-1. A host 118 sends read and write requests to the virtual volume via target driver 108-1 using, e.g., the SCSI protocol.

Similarly, node 102-2 includes a data stack 106-2 residing in the kernel level. Data stack 106-2 also includes a target driver 108-2, a virtual volume layer 110-2, a logical disk layer 112-2, a physical disk layer 114-2, and an initiator driver 116-2. Components of data stacks 106-1 and 106-2 communicate by a node-to-node link 122.

System manager 104 resides only on one of the nodes of utility storage server 100. If system manager 104 fails at one of the nodes, it can be restarted at another node. System manager 104 keeps a single system image of utility storage server 100. System manager 104 also services events from the data stacks, delivers configuration commands to the data stacks, and records system configuration information in a table of contents (TOC) on a physical disk drive.

Figure 2:
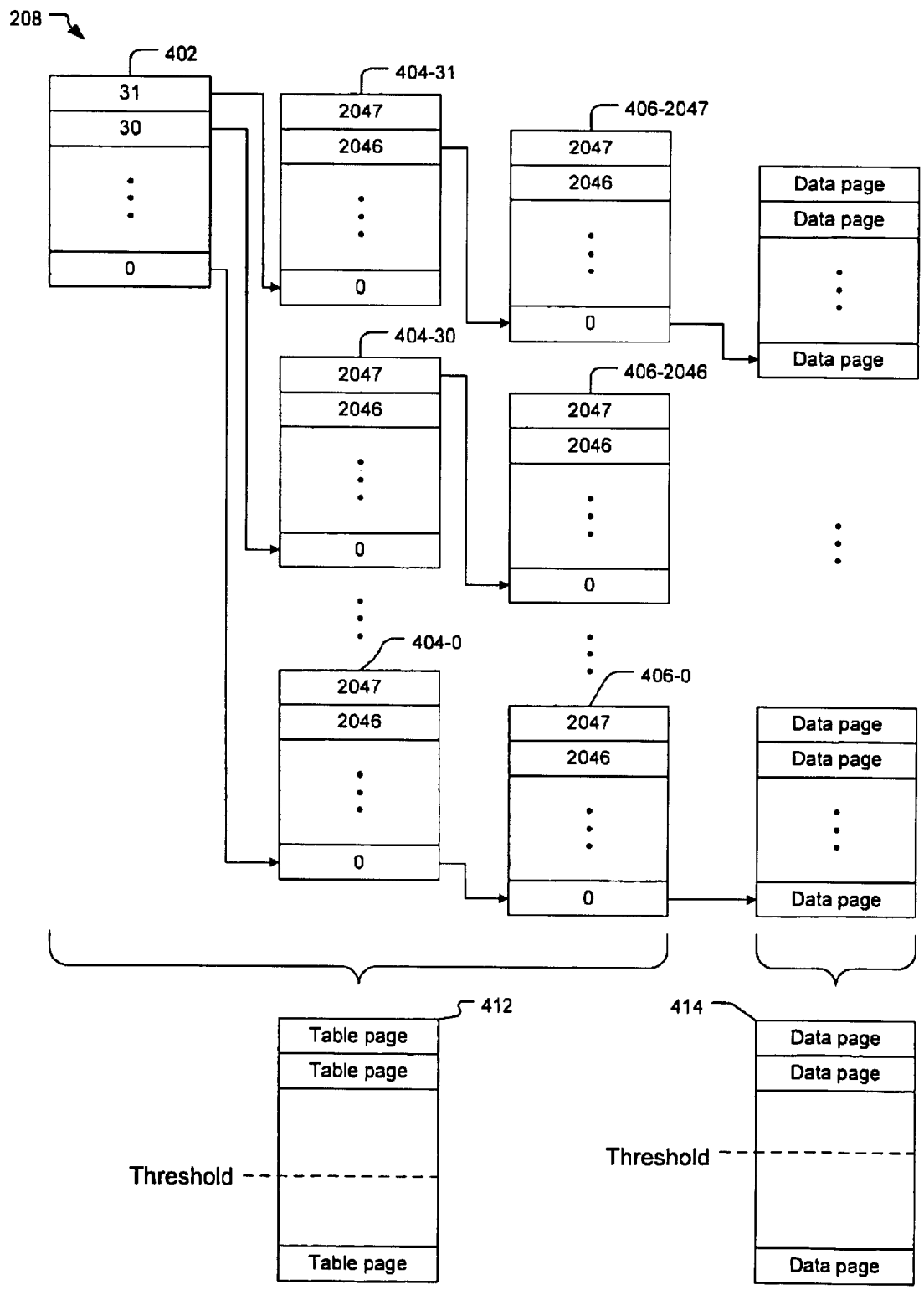
FIG. 2 illustrates a representation of the mapping of pages in a virtual volume pages to pages in a logical disk of a node in one embodiment.

FIG. 2 illustrates the mapping of a virtual volume 208 to a logical disk (e.g., logical disk 207 in FIG. 3) in one embodiment of the invention. Virtual volume 208 is an exception list made up of address tables that map pages of a virtual volume 208 to pages of logical disk 207 storage. Virtual volume 208 also includes pools 412 and 414 of logical disk storage from which these exception list tables and logical disk data pages are allocated. In one embodiment, virtual volume 208 is implemented using a snapshot mechanism in which the exception list tracks changes to a dummy base volume consisting of only zeroes.

Figure 3A:
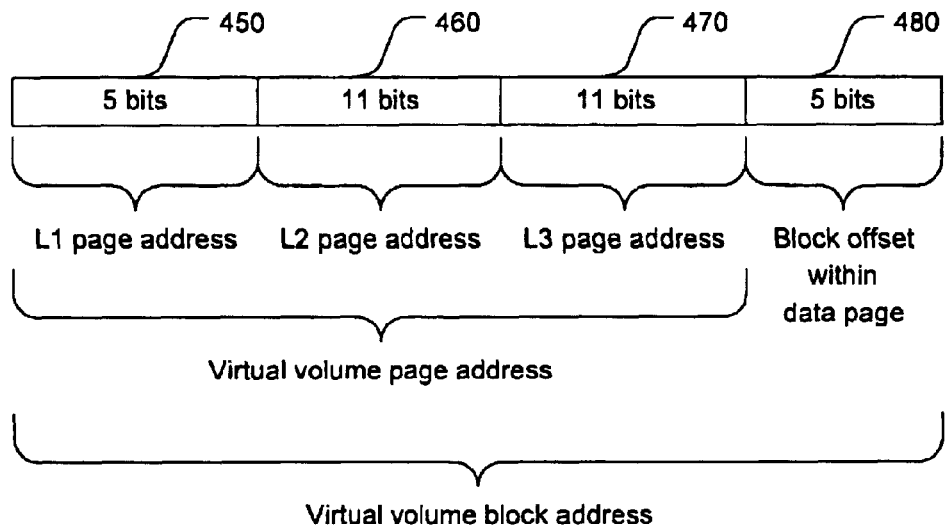
FIG. 3A illustrates a virtual volume block address and its component segments in one embodiment of the invention.

The address tables are divided into three levels. This is because virtual volume 208 is written or read in blocks each identified by a virtual volume block address. The virtual volume block address includes a virtual volume page address consisting of parts 450, 460, and 470 (FIG. 3A). Parts 450, 460, and 470 lead to a page in virtual volume 208, which is mapped to a corresponding page in logical disk 207. The virtual volume block address further includes a block offset 480 (FIG. 3A) that leads to a data block in the corresponding page in logical disk 207.

A level 1 table (e.g., table 402) consists of entries that can be indexed by the first part 450 of the page address. Specifically, part 450 provides an offset from the start of the level 1 table. Each entry in the level 1 table stores a pointer to the start of a level 2 table that shares the first part of the page address.

Each of the level 2 tables (e.g., table 404-0 to 404-31) consists of entries that can be indexed by the second part 460 of the page addresses. Specifically, part 460 provides an offset from the start of a level 2 table. Each entry in the level 2 table stores a pointer to the start of a level 3 table that shares the first and the second part of the page address.

Each of the level 3 tables (e.g., tables 406-0 to 406-2047 in one embodiment) consists of entries that can be indexed by the third part 470 of the page addresses. Specifically, part 470 provides an offset from the start of a level 3 table. Each entry in the level 3 table stores a pointer to a page in a logical disk. Accordingly, a page in the virtual volume (e.g., VV data page) is mapped to a page in a logical disk (e.g., LD data page). Part 480 of the page address identifies an offset of a data block (i.e., block offset) from the start of the LD data page.

Virtual volume layer 110-1 initially creates virtual volume 208 with only a blank level 1 table. As data is written to virtual volume 208 (described later), virtual volume layer 110-1 allocates LD data pages and adds the level 2 and level 3 tables that are necessary to manage these LD data pages.

Figure 4A:
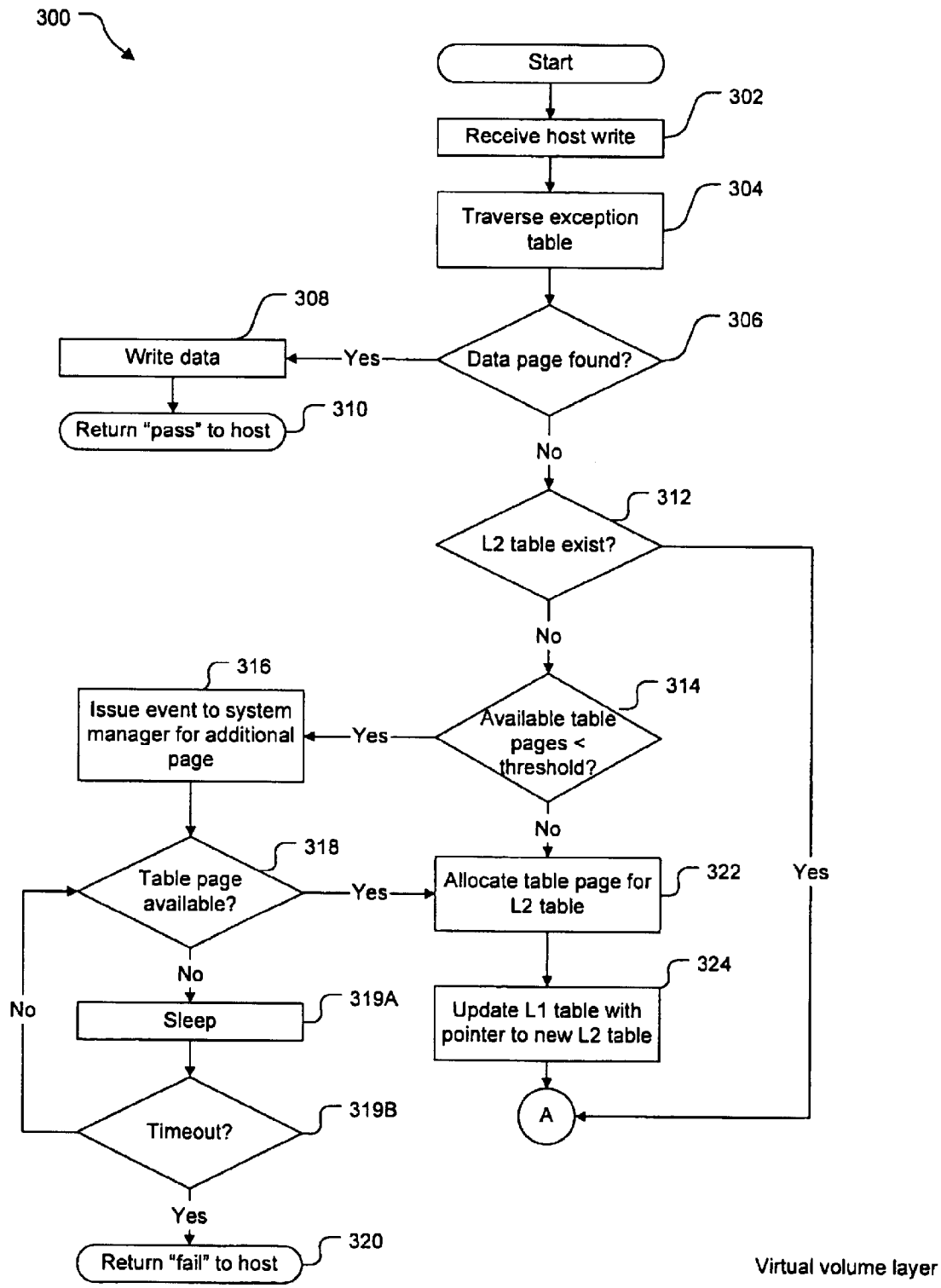
FIGS. 4A, 4B, and 4C illustrate a method for a virtual volume layer to respond to a write request to the virtual volume in one embodiment of the invention.
Figure 4B:
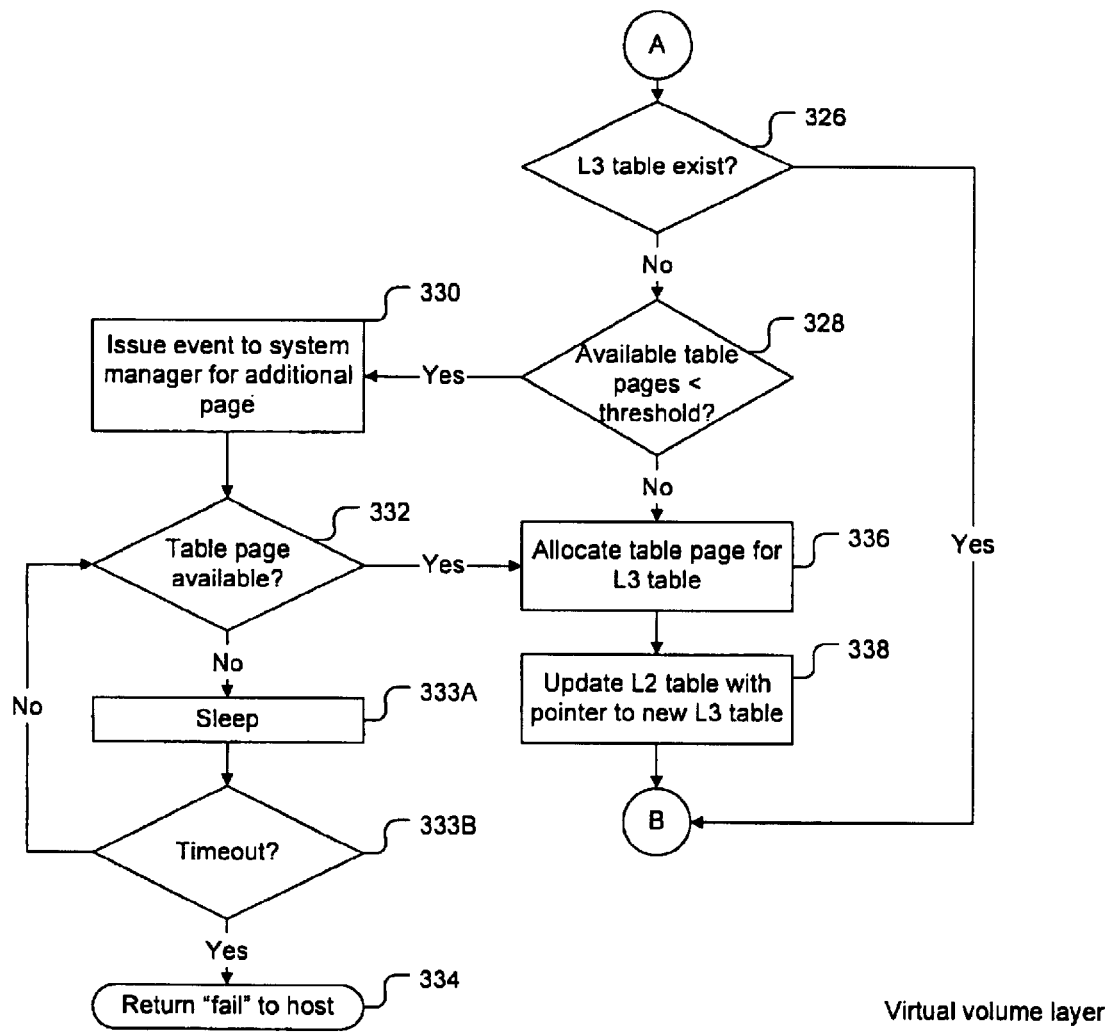
Figure 4C:
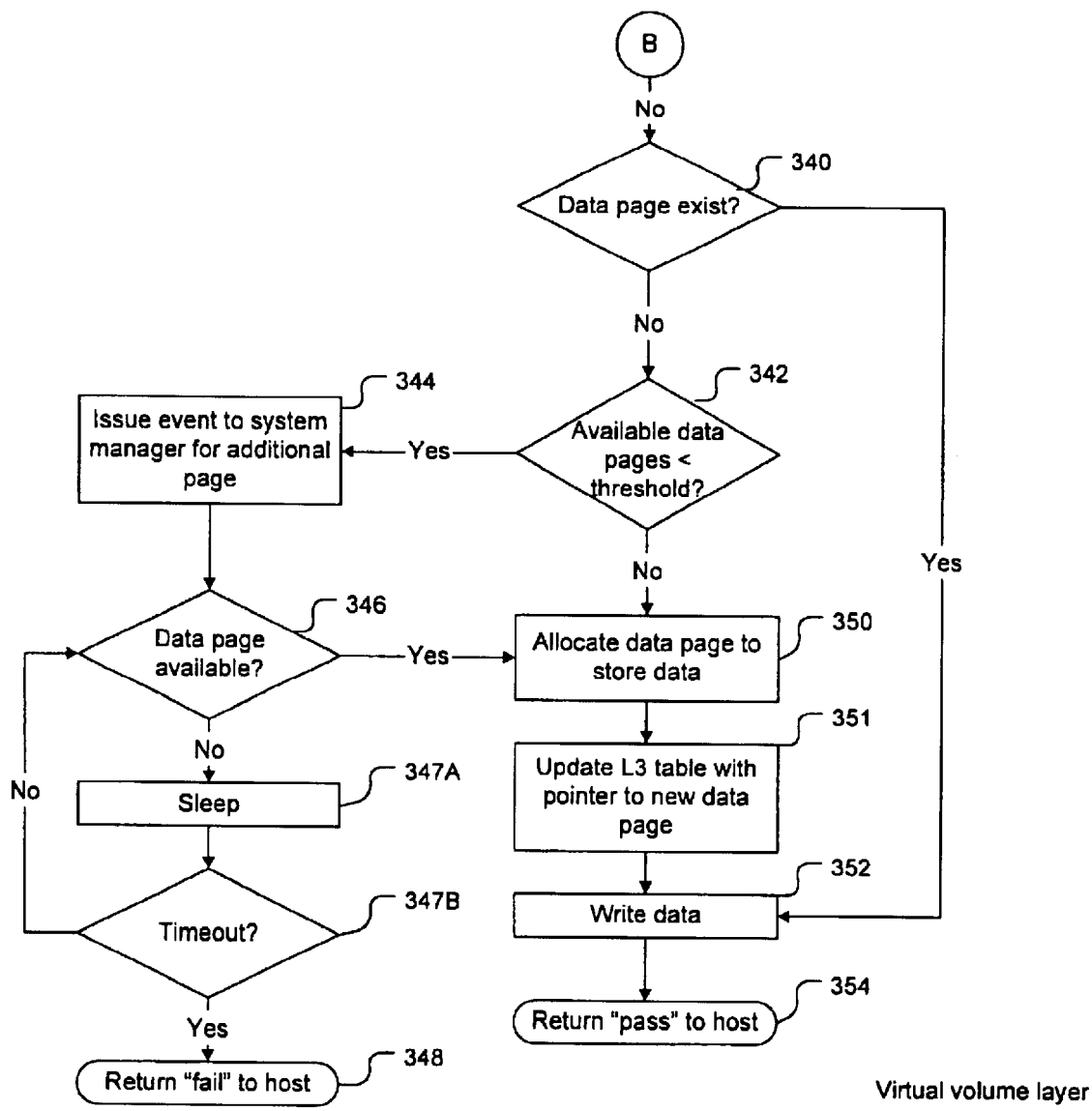

FIGS. 4A, 4B, and 4C illustrate a method 300 for virtual volume layer 110-1 to respond to a write request from host 118 (or an application) to virtual volume 208 in one embodiment.

In step 302, virtual volume layer 110-1 receives a write request to a data block in virtual volume 208. The write request identifies the data block by the ID of virtual volume 208 and its virtual volume block address. Step 302 is followed by step 304.

In step 304, virtual volume layer 110-1 traverses tables 402, 404, and 406 to find the LD data page that corresponds to the virtual volume block address. Step 304 is followed by step 306.

In step 306, virtual volume layer 110-1 determines if the corresponding LD data page has been found. If so, step 306 is followed by step 308. Otherwise step 306 is followed by step 312. The corresponding LD data page cannot be found if the VV data page to-be-written in virtual volume 208 has not been mapped to an LD data page by pointers and address tables as described above.

In step 308, virtual volume layer 110-1 instructs logical disk layer 112-1 to issue a write to the corresponding LD data page. Specifically, virtual volume 110-1 identifies the block by a logical disk ID and an offset from the start of the logical disk. The offset from the start of the logical disk is determined from the sum of (1) the offset of the LD region from the start of the logical disk, (2) the offset of the LD data page from the start of the LD region, and (3) the block offset of the data block from the start of the LD data page. In one embodiment, the write is replicated to the other nodes (e.g., node 102-2) for failover protection. Step 308 is followed by step 310.

In step 310, virtual volume layer 110-1 returns a "pass" status to the host and ends method 300.

In step 312, virtual volume layer 110-1 determines if a level 2 (L2) address table exists for the requested VV data page. If so, then step 312 is followed by step 326. Otherwise step 312 is followed by step 314.

In step 314, virtual volume layer 110-1 determines if the number of available LD table pages in a pool 412 (FIG. 2) for storing address tables is less than a threshold. If so, then step 314 is followed by step 316. Otherwise step 314 is followed by step 322.

In step 316, virtual volume layer 110-1 issues an event to system manager 104. In response to the event, system manager 104 may allocate an available LD region to virtual volume layer 110-1. System manager 104 may allocate the LD region in a method 500 described later in reference to FIG. 5. Virtual volume layer 110-1 divides the allocated LD region into LD table pages and increments pool 412 with these new pages. Step 316 is followed by step 318.

In step 318, virtual volume layer 110-1 determines if an LD table page is available to be used as an L2 table. If so, then step 318 is followed by step 322. Otherwise step 318 is followed by step 319A.

In step 319A, virtual volume layer 110-1 sleeps for a predetermined amount of time. Step 319A is followed by step 319B.

In step 319B, virtual volume 110-1 determines if a timeout has been reached. If so, then step 319B is followed by step 320. Otherwise step 319B is followed by step 318.

In step 320, virtual volume 110-1 returns a "fail" status to the host and ends method 300.

In step 322, virtual volume 110-1 creates an L2 table from an available LD table page in pool 412. Step 322 is followed by step 324.

In step 324, virtual volume 110-1 updates the level one (L1) table with a pointer to the newly created L2 table. Specifically, virtual volume 110-1 writes the pointer in the L1 table entry having an offset identified by the first part of the virtual volume page address. Step 324 is followed by step 326.

In step 326 (FIG. 4B), virtual volume layer 110-1 determines if a level 3 (L3) table exists for the requested VV data page. If so, then step 326 is followed by step 340. Otherwise step 326 is followed by step 328.

In step 328, virtual volume layer 110-1 determines if the number of available LD table pages in pool 412 (FIG. 2) for storing address tables is less than a threshold. If so, then step 328 is followed by step 330. Otherwise step 328 is followed by step 336.

In step 330, virtual volume layer 110-1 issues an event to system manager 104. In response to the event, system manager 104 may allocate an available LD region to virtual volume layer 110-1. System manager 104 may allocate the LD region in a method 500 described later in reference to FIG. 5. Virtual volume layer 110-1 divides the LD region into LD table pages and increments pool 412 with these new pages. Step 330 is followed by step 332.

In step 332, virtual volume layer 110-1 determines if an LD table page is available to be used as an L3 table. If so, then step 332 is followed by step 336. Otherwise step 332 is followed by step 333A.

In step 333A, virtual volume layer 110-1 sleeps for a predetermined amount of time. Step 333A is followed by step 333B.

In step 333B, virtual volume 110-1 determines if a timeout has been reached. If so, then step 333B is followed by step 334. Otherwise step 333B is followed by step 332.

In step 334, virtual volume 110-1 returns a "fail" status to the host and ends method 300.

In step 336, virtual volume 110-1 creates an L3 table from an available page in pool 412. Step 336 is followed by step 338.

In step 338, virtual volume 110-1 updates the corresponding L2 table with a pointer to the newly created L3 table. Specifically, virtual volume 110-1 writes the pointer in the L2 table entry having an offset identified by the second part of the virtual volume page address. Step 338 is followed by step 340.

In step 340 (FIG. 4C), virtual volume layer 110-1 determines if an LD data page in the logical disk exists for the virtual volume block address received. If so, then step 340 is followed by step 352. Otherwise step 340 is followed by step 342.

In step 342, virtual volume layer 110-1 determines if the number of available LD data pages in a pool 414 (FIG. 2) for storing data is less than a threshold. If so, then step 342 is followed by step 344. Otherwise step 342 is followed by step 350.

In step 344, virtual volume layer 110-1 issues an event to system manager 104. In response to the event, system manager 104 may allocate an available LD region to pool 414. System manager 104 may allocate the LD region in method 500 described later in reference to FIG. 5. Virtual volume layer 110-1 divides the LD region into LD data pages and increments pool 414 with these new pages. Step 344 is followed by step 346.

In step 346, virtual volume layer 110-1 determines if an LD data page is available to be used. If so, then step 346 is followed by step 350. Otherwise step 346 is followed by step 347A.

In step 347A, virtual volume layer 110-1 sleeps for a predetermined amount of time. Step 347A is followed by step 347B.

In step 347B, virtual volume layer 110-1 determines if a timeout has been reached. If so, then step 347B is followed by step 348. Otherwise step 347B is followed by step 346.

In step 348, virtual volume layer 110-1 returns a "fail" status to the host and ends method 300.

In step 350, virtual volume layer 110-1 allocates an LD data page to virtual volume 208 from pool 414 to store data. Step 350 is followed by step 351.

In step 351, virtual volume layer 110-1 updates the corresponding L3 table with a pointer to the new LD data page in virtual volume 208. Specifically, virtual volume 110-1 writes the pointer in the L3 table entry having an offset identified by the third part of the virtual volume page address. Step 351 is followed by step 352.

In step 352, virtual volume layer 110-1 writes the data into the new LD data page at an offset identified by the block offset of the virtual volume block address. Specifically, virtual volume layer 110-1 identifies the block by a logical disk ID and an offset from the start of the logical disk. The offset from the start of the logical disk is determined from the sum of (1) the offset of the LD region from the starting address of the logical disk, (2) the offset of the LD data page from the starting address of the LD region, and (3) the block offset of the data block from the starting address of the LD data page. Step 352 is followed by step 354.

In step 354, virtual volume 10-1 returns a "pass" status to the host and ends method 300.

Figure 5:
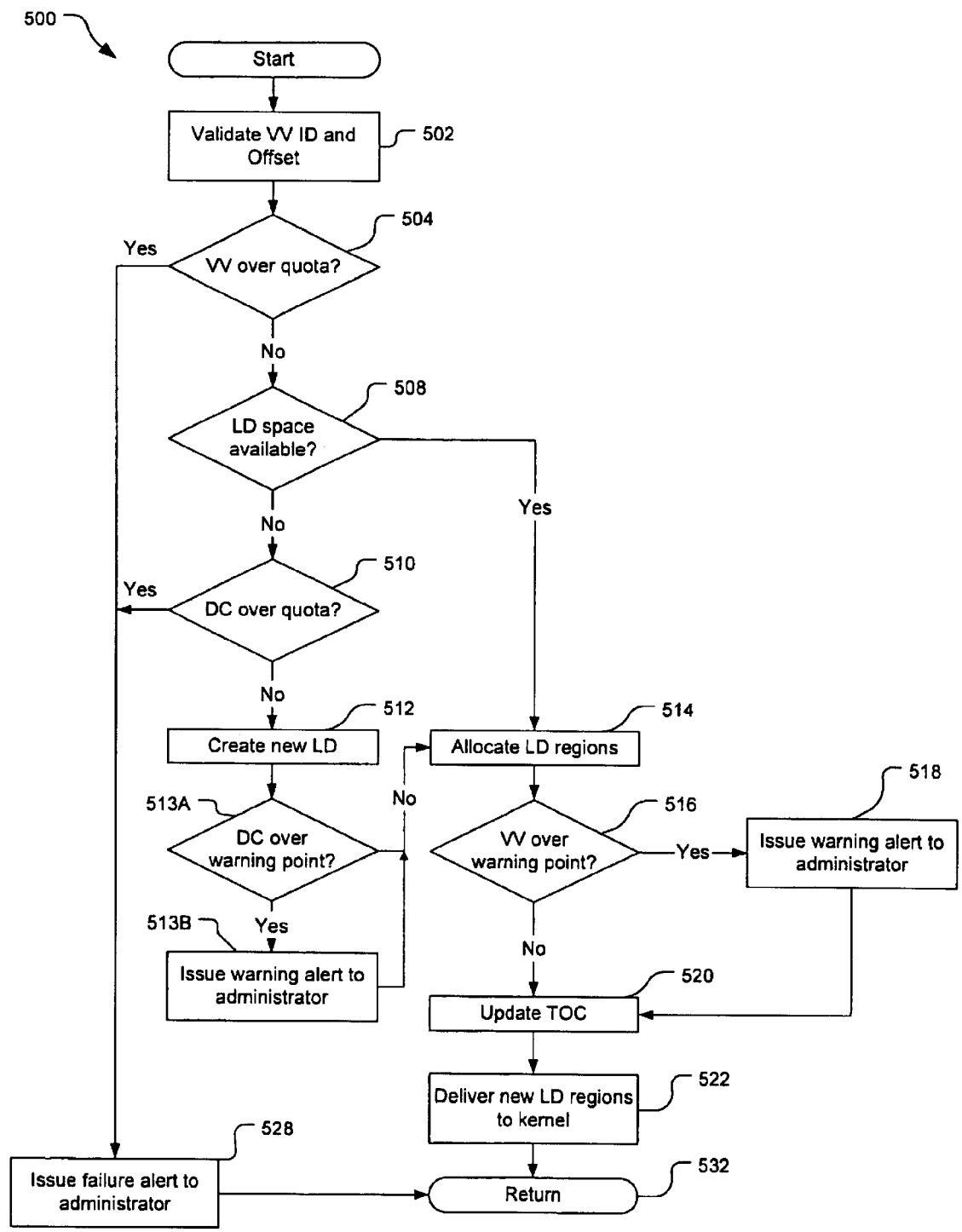
FIG. 5 illustrates a method for a system manager to respond to an event requesting an additional logical disk region from the virtual volume layer in one embodiment of the invention.

FIG. 5 illustrates a method 500 for system manager 104 to respond to the event from a virtual volume layer (e.g., virtual volume layer 110-1) in one embodiment.

In step 502, system manager 104 validates the virtual volume ID and retrieves a data allocation control structure (DC) for the virtual volume identified by the virtual volume ID. DC, also know as common provisioning group (CPG), is a part of system manager 104 that sets the maximum physical allocation for each virtual volume, the maximum physical allocation of all the virtual volumes owned (i.e., controlled) by the DC, and warning points for the physical allocation of each virtual volume and the DC itself. DC also sets the RAID characteristics of the logical disks and the set of nodes in a cluster from which the physical disk drive chunklets are allocated when creating additional logical disks.

In step 504, system manager 104 determines if the physical allocation of the identified virtual volume (e.g., virtual volume 208) is over the maximum physical allocation specified by the DC. The maximum physical allocation can have a default value or be set by the user. If the size of the virtual volume is over the maximum physical allocation, step 504 is followed by step 528. If not, step 504 is followed by step 508.

In step 508, system manager 104 determines if one or more LD regions are available in existing logical disks (e.g., logical disk 207). If one or more LD regions are available, step 508 is followed by step 514. If not, step 508 is followed by step 510.

In step 510, system manager 104 determines if the total physical allocation of the virtual volumes owned by the DC is over the maximum physical allocation specified by the DC. If the size of the DC is over the maximum physical allocation, step 510 is followed by step 528. If not, step 510 is followed by step 512.

In step 512, system manager 104 instructs logical disk layer 112-1 to create one or more new logical disks from chunklets in the physical disks. Step 512 is followed by step 513A.

In step 513A, system manager 104 determines if the size of the DC is over a warning point specified by the DC. The warning point provides an early warning to the user that the physical limit is approaching. The warning point can have a default value or be set by the user. If the size of the DC is over the warning point, step 513A is followed by step 513B. If not, step 513A is followed by step 514.

In step 513B, system manager 104 issues an allocation warning alert to the administrator of system 100. Step 513B is followed by step 514.

In step 514, system manager 104 allocates (e.g., assigns) one or more available LD regions in the logical disk (whether existing or newly created) to be mapped to virtual volume pages. Each LD region is identified by a logical disk ID and an offset from the start of the logical disk. Step 514 is followed by step 516.

In step 516, system manager 104 determines if the physical allocation of the virtual volume is over a warning point specified by the DC. The warning point provides an early warning to the user that the physical limit is approaching. The warning point can have a default value or be set by the user. If the size of the virtual volume is over the warning point, step 516 is followed by step 518. If not, step 516 is followed by step 520.

In step 518, system manager 104 issues an allocation warning alert to the administrator of system 100. Step 518 is followed by step 520.

In step 520, system manager 104 updates the table of contents (TOC). TOC stores the organization of the virtual volumes, the logical disks, and the chunklets of server 100 on one or more physical disk drives. Step 520 is followed by step 522.

In step 522, system manager 104 delivers the one or more LD regions to virtual volume layer 110-1. As described above, virtual volume layer 110-1 divides the one or more LD regions into LD table or data pages and increments pool 412 or 414 with these new pages. Step 522 is followed by step 532.

In step 528, system manager 104 issues an allocation failure alert to the administrator of system 100. Step 528 is followed by step 532.

In step 532, system manager 104 ends method 500.

Figure 6:
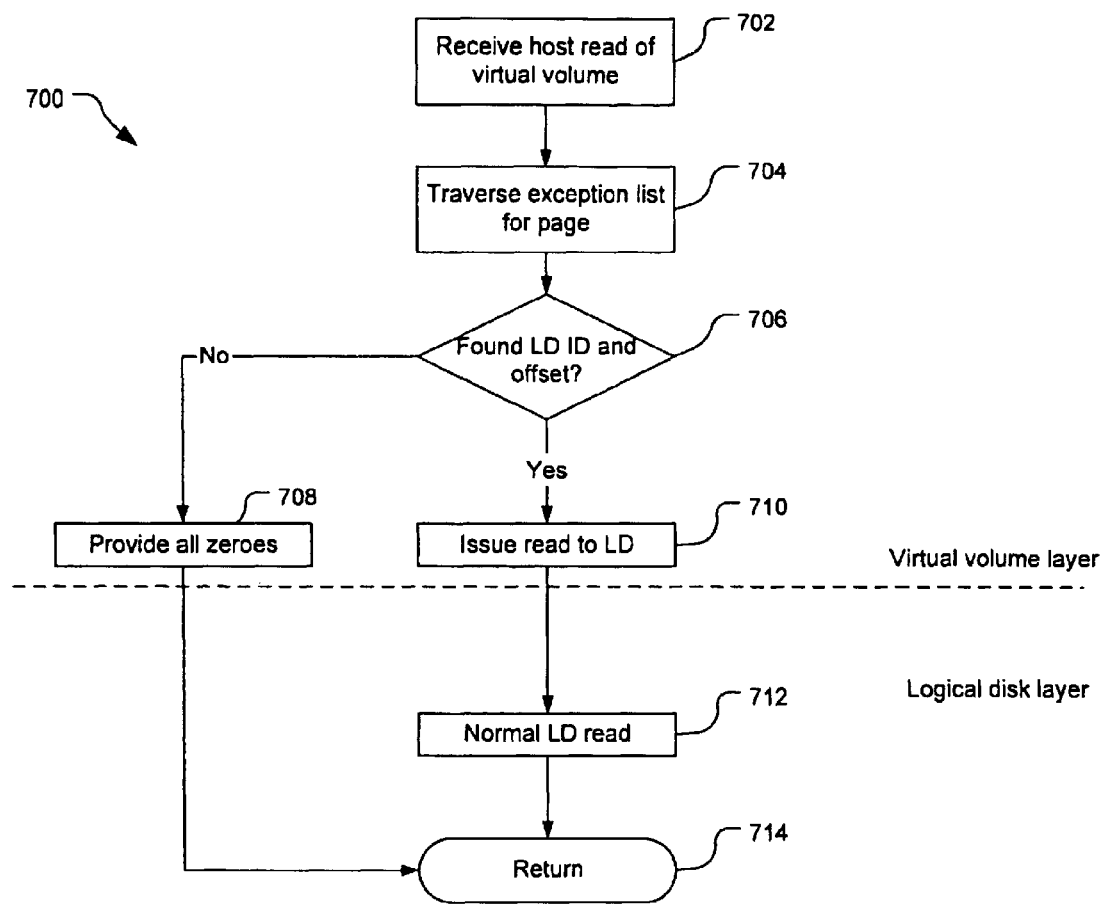
FIG. 6 illustrates a method for the virtual volume layer and the logical disk layer to respond to a read request from the host in one embodiment.

FIG. 6 illustrates a method 700 for a virtual volume layer (e.g., virtual volume layer 1101) and a LD layer (e.g., logical disk layer 112-1) to respond to a read request from host 118 in one embodiment.

In step 702, virtual volume layer 110-1 receives from host 118 a read request of a data block in a virtual volume (e.g., virtual volume 208). The read request identifies the VV data block by a virtual volume ID and a virtual volume block address.

In step 704, volume layer 110-1 traverses tables 402, 404, and 406 to find a LD data page corresponding to the virtual volume block address. As described above, if such an LD data page exists, the virtual volume block address can be mapped by a pointer identifying a logical disk ID and an offset from the start of the logical disk. Step 704 is followed by step 706.

In step 706, volume layer 110-1 determines if it has found the logical disk ID and the offset from the start of the logical disk. If so, step 706 is followed by step 710. Otherwise step 706 is followed by step 708.

In step 708, virtual volume layer 110-1 returns all zeros to host 118 in response to the read request. In one embodiment, the virtual volume (also referred to as a "Thin Provisioned Virtual Volume" or "TPVV") is implemented using snapshot technology as a list of differences (exceptions) from a dummy base volume having all zeros. When a data block for a read request cannot be found in the virtual volume exception list, virtual volume layer 110-1 will look to the dummy base volume for the requested data block having the specified virtual volume block address. When searching for the requested data block in the dummy base volume, virtual volume layer 110-1 will find only zeros and thus return only zero data to host 118. For a description of a snapshot implemented as an exception list, please see U.S. patent application Ser. No. 10/655,951, entitled "Time-And-Space Efficient Mechanism To Create Virtual Storage Volume Copies," U.S. patent application Ser. No. 10/655,963, entitled "Efficient And Reliable Virtual Volume Mapping," and U.S. patent application Ser. No. 10/655,961, entitled "Read/Write Snapshot," which are incorporated by reference in their entirety. Step 708 is followed by step 714.

In step 710 virtual volume layer 110-1 issues a read command to the data block identified by the logical ID and the identified offset to logical disk layer 112-1. Step 708 is followed by step 712.

In step 712, logical disk layer 112-1 performs a normal read to the data block identified by the logical disk ID and the identified offset. Step 712 is followed by step 714.

In step 714, logical disk layer 112-1 ends method 600.

Various other adaptations and combinations and combinations of features of the embodiments disclosed are within the scope of the invention. Numerous embodiments are encompassed by the following claims.

What is claimed is:

1. A method for writing to a virtual volume mapped to a logical disk, comprising:

receiving a request to write a data to the virtual volume at an address;

traversing a first table representing the virtual volume to find a first pointer at a first offset based on a first portion of the address, the first pointer leading to one of a plurality of second tables ("said one second table") also representing the virtual volume;

following the first pointer to said one second table;

traversing said one second table to find a second pointer at a second offset based on a second portion of the address, the second pointer leading to one of a plurality of third tables ("said one third table");

if said one second table does not exist,
   determining if a number of available table pages in a first pool is less than a first threshold;
   if the number of available table pages in the first pool is not less than the first threshold,
      allocating one table page from the first pool to form said one second table;
      writing the first pointer at the first offset in the first table.

2. The method of claim 1, further comprising:

if the number of available table pages in the first pool is less than the first threshold,
   requesting additional table pages to be added to the first pool;
   determining if the additional table pages have been added before timing out;
   if the additional table pages have been added before timing out,
      allocating one table page from the first pool to form said one second table;
      writing the first pointer at the first offset in the first table;
   if the additional table pages have not been added before timing out, returning a write failure message.

3. The method of claim 2, further comprising:

following the second pointer to said one third table;

traversing said one third table to find a third pointer at a third offset based on a third potion of the address, the third pointer leading to one of a plurality of data pages ("said one data page");

if said one third table does not exist,
   determining if the number of available table pages in the first pool is less than the first threshold;
   if the number of available table pages in the first pool is not less than the first threshold,
      allocating one table page from the first pool to form said one third table;
      writing the second pointer at the second offset in the second table.

4. The method of claim 3, further comprising:

if the number of available table pages in the first pool is less than the first threshold,
   requesting additional table pages to be added to the first pool;
   determining if the additional table pages have been added before timing out;
   if the additional table pages have been added before timing out,
      allocating one table page from the first pool to form said one third table;

writing the second pointer at the second offset in the second table;
if the additional table pages have not been added before timing out, returning the write failure message.

5. The method of claim 4, further comprising:
following the third pointer to said one data page;
writing the data to said one data page at a fourth offset based on a fourth portion
of the address and returning a write pass message;
if said one data page does not exist,
determining if the number of available data pages in a second pool is less than a second threshold;
if the number of available data pages in the second pool is not less than the second threshold,
allocating one data page from the second pool to form said one data page;
writing the third pointer at the third offset in the third table;
writing the data to said one data page at the fourth offset and returning the write pass message.

6. The method of claim 5, further comprising:
if the number of available data pages in the second pool is less than the second threshold;
requesting additional data pages to be added to the second pool;
determining if the additional data pages have been added before timing out;
if the additional data pages have been added before timing out,
allocating one data page from the second pool to form said one data page;
writing the third pointer at the third offset in the third table;
writing the data to said one data page at the fourth offset and returning the write pass message;
if the additional data pages have not been added before timing out, returning the write failure message.

7. The method of claim 6, in response to said requesting additional table pages to be added to the first pool or said requesting additional data pages to be added to the second pool,
retrieving an allocation control structure associated with the virtual volume, the allocation control structure comprising a first maximum physical allocation for the virtual volume, a second maximum physical allocation for a group of virtual volumes including the virtual volume, a first warning point on the first maximum physical allocation, a second warning point on the second maximum physical allocation, and RAID parameters controlling the creation of additional logical disk storage;
determining if the virtual volume is greater than the first maximum physical allocation;
if the virtual volume is greater than the first maximum physical allocation, issuing an allocation failure alert and terminating the allocation request processing.

8. The method of claim 7, further comprising,
if the virtual volume is not greater than the first maximum physical allocation,
determining if the logical disk has one storage unit ("logical disk region") available;
if the logical disk has one logical disk region available,
dividing said one logical disk region into table or data pages;
allocating the table or data pages to the first or the second pool;
updating a system table of contents to record the allocation of said one logical disk region to the virtual volume;
determining if the virtual volume is greater than the first warning point;
if the virtual volume is greater than the first warning point, issuing an allocation warning alert.

9. The method of claim 8, further comprising:
if the logical disk does not have one logical disk region available,
determining if the group of virtual volumes is greater than the second maximum physical allocation;
if the group of virtual volumes is greater than the second maximum physical allocation, issuing an allocation failure alert and terminating the allocation request processing.

10. The method of claim 9, further comprising:
if the group of virtual volumes is not greater than the second maximum physical allocation,
creating a new logical disk;
determining if the group of virtual volumes is greater than the second warning point;
if the group of virtual volumes is greater than the second warning point,
issuing an allocation warning alert;
dividing a logical disk region from the new logical disk into table or data pages;
allocating the table or data pages to the first or the second pool; and
updating a system table of contents to record the allocation of the logical disk region to the virtual volume.

11. The method of claim 1, wherein the virtual volume is distributed amongst a system of nodes, the method further comprising replicating the data to another node in the system.

12. A method for provisioning a virtual volume mapped to a logical disk, comprising:
receiving a request to write a data to the virtual volume at an address;
traversing a table representing the virtual volume to find a pointer at an offset based on a portion of the address, the pointer leading to one of a plurality of data pages ("said one data page");
if said one data page does not exist,
determining if a number of available data pages in a pool is less than a threshold;
if the number of available data pages in the pool is less than the threshold,
requesting additional data pages to be added to the pool;
determining if the logical disk has one storage unit ("logical disk region") available;
if the logical disk has one logical disk region available,
dividing said one logical disk region into data pages;
allocating the data pages to the pool.

13. The method of claim 12, further comprising:
if the logical disk does not have one logical disk region available,
creating a new logical disk;
dividing a logical disk region from the new logical disk into data pages;
allocating the data pages to the pool.

14. The method of claim 13, further comprising:
if the number of available data pages in the pool is not less than the threshold,
allocating one data page from the pool to form said one data page;

writing the data to said one data page at the offset based on another portion of the address and returning a write pass message.

15. The method of claim 12, in response to said requesting additional data pages to be added to the pool, further comprising:

issuing an allocation failure alert if the virtual volume is greater than a limit point on maximum physical allocation.

16. The method of claim 15, in response to said requesting additional data pages to be added to the pool, further comprising:

issuing an allocation warning alert if the virtual volume is greater than a warning point on maximum physical allocation, the warning point being less than the limit point.

17. The method of claim 12 in response to said requesting additional data pages to be added to the pool, further comprising:

issuing an allocation failure alert if a group of virtual volumes is greater than a limit point on maximum physical allocation.

18. The method of claim 17, in response to said requesting additional data pages to be added to the pool, further comprising:

issuing an allocation warning alert if a group of virtual volumes including the virtual volume is greater than a warning point on maximum physical allocation, the warning point being less than the limit point.

* * * * *